(12) United States Patent
Singh et al.

(10) Patent No.: US 11,652,894 B2
(45) Date of Patent: May 16, 2023

(54) DEVICE CAPABILITY OVER DIAL

(71) Applicant: ARRIS Enterprises LLC, Suwanee, GA (US)

(72) Inventors: Virendra Singh, Karnataka (IN); Vinod Jatti, Karnataka (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/458,910

(22) Filed: Aug. 27, 2021

(65) Prior Publication Data

US 2022/0078249 A1  Mar. 10, 2022

Related U.S. Application Data

(60) Provisional application No. 63/075,546, filed on Sep. 8, 2020, provisional application No. 63/075,562, filed on Sep. 8, 2020.

(51) Int. Cl.
  *H04L 67/51* (2022.01)
  *H04L 67/141* (2022.01)
  *H04L 67/146* (2022.01)
  *H04L 67/01* (2022.01)

(52) U.S. Cl.
  CPC ............ *H04L 67/51* (2022.05); *H04L 67/01* (2022.05); *H04L 67/141* (2013.01); *H04L 67/146* (2013.01)

(58) Field of Classification Search
  CPC ....... H04L 67/01; H04L 67/51; H04L 67/141; H04L 67/146

USPC ......................................................... 709/219
See application file for complete search history.

(56) References Cited

U.S. PATENT DOCUMENTS

| | | | |
|---|---|---|---|
| 2014/0006474 A1* | 1/2014 | White | H04N 21/44227 709/201 |
| 2014/0108614 A1* | 4/2014 | Gunderson | H04L 65/1069 709/219 |
| 2018/0249202 A1* | 8/2018 | Ryu | H04N 21/44 |
| 2018/0343240 A1* | 11/2018 | Marchand | H04L 63/08 |
| 2021/0112307 A1* | 4/2021 | Thomas | H04L 12/28 |

\* cited by examiner

*Primary Examiner* — Wing F Chan
*Assistant Examiner* — Leon Y Tseng
(74) *Attorney, Agent, or Firm* — Wenderoth, Lind & Ponack, L.L.P.

(57) ABSTRACT

A second screen device can discover one or more first screen devices connected to a network using a DIAL discovery request. In response to the DIAL request, a preferred first screen device sends a formatted response that includes one or more capabilities associated with an application or software that is executed by or hosted by the first screen device. For example, the formatting can use a header extension for a response to a DIAL discovery request. In another example, the formatting can use a header tag for a response to a DIAL device description request. Formatting the response to the DIAL request to include information about the capabilities of the first screen device ensures that the first screen device that is preferred for the playback of selected content is positioned at the top of the list or menu presented to a user at the second screen device.

20 Claims, 8 Drawing Sheets

```
<root>
  <specVersion>
  <major>2</major>
  <minor>1</minor>
  </specVersion>
  <URLBase>http://192.168.80.103:9098</URLBase>
  <device>
    <deviceType>urn:schemas-upnp-org:device:dial:2</deviceType>
    <friendlyName>MediaRoom</friendlyName>
    <manufacturer>COMMSCOPE</manufacturer>
    <manufacturerURL>http://www.commscope.com</manufacturerURL>
    <modelDescription>DIAL Server</modelDescription>
    <modelName>VMSP2</modelName>
    <serialNumber>M1181065</serialNumber>
    <UDN>uuid:212b7-1dd2-11b2-8215-2517</UDN>
    <capabilities>
      <hdcp-version>2.2<hdcp-version>
      <TEE>" YES" </TEE>
      <DRMs>
        <widevine> 3.2 </widevine>
        <playready> 3.0 </playready>
      </DRMs>
      <video-formats>"H264-4K, H264-1080p, VP9-4K, VP9-1080p etc." </video-formats >
      <audio-formats>"AAC, Opus etc." <audio-formats>
    </capabilities>
  </device>
</root>
```

List of First Screen Devices
(No Formatting)

```
D Brand Set Top Box

J Brand Television

Q Brand Video Playback Device

Z Brand Preferred DIAL Server
```

*FIG. 3A*

List of First Screen Devices
(No Formatting)

```
␣D Brand Set Top Box

J Brand Television

Q Brand Video Playback Device

Z Brand Preferred DIAL Server
```

*FIG. 4A*

List of First Screen Devices
(Single Space Formatting)

```
␣Z Brand Preferred DIAL Server

D Brand Set Top Box

J Brand Television

Q Brand Video Playback Device
```

*FIG. 3B*

List of First Screen Devices
(Double Space Formatting)

```
␣␣Z Brand Preferred DIAL Server

␣D Brand Set Top Box

J Brand Television

Q Brand Video Playback Device
```

*FIG. 4B*

List of First Screen Devices
(Multiple Character Formatting)

```
␣ A Z Brand Preferred DIAL Server

␣D Brand Set Top Box

J Brand Television

Q Brand Video Playback Device
```

```
<root>
 <specVersion>
  <major>2</major>
  <minor>1</minor>
 </specVersion>
 <URLBase>http://192.168.80.103:9098</URLBase>
 <device>
  <deviceType>urn:schemas-upnp-org:device:dial:2</deviceType>
  <friendlyName>MediaRoom</friendlyName>
  <manufacturer>COMMSCOPE</manufacturer>
  <manufacturerURL>http://www.commscope.com</manufacturerURL>
  <modelDescription>DIAL Server</modelDescription>
  <modelName>VMSP2</modelName>
  <serialNumber>M1181065</serialNumber>
  <UDN>uuid:212b7-1dd2-11b2-8215-2517</UDN>
  <capabilities>
   <hdcp-version>2.2<hdcp-version>
   <TEE>" YES" </TEE>
   <DRMs>
    <widevine> 3.2 </widevine>
    <playready> 3.0 </playready>
   </DRMs>
   <video-formats>"H264-4K, H264-1080p, VP9-4K, VP9-1080p etc." </video-formats>
   <audio-formats>"AAC, Opus etc." <audio-formats>
  </capabilities>
 </device>
</root>
```

56 → (points to <UDN> / <capabilities>)
58 → (points to capability elements)

FIG. 6C

DEVICE CAPABILITY OVER DIAL

This application claims the benefit of U.S. Provisional Application Ser. No. 63/075,562, which was filed Sep. 8, 2020 and U.S. Provisional Application Ser. No. 63/075,546, which was filed Sep. 8, 2020.

BACKGROUND

Companies are increasingly providing Multiple Access Point (MAP) architecture or Home Network Controller (HNC) type of home wireless fidelity (Wi-Fi) management, with multiple access point devices and/or extender access point devices (collectively, network devices) within the home to improve Quality of Experience (QoE) of the user by offering extended coverage with seamless roaming. Access point devices and extender access point devices communicate with network devices using one or more RF channels. Typically, 5 GigaHertz (GHz) radio is used for Wi-Fi backhaul in extender access point devices because such offers more bandwidth with less interference and greater reliability when compared to 2.4 GHz radio.

Many network configurations can include various multi-media or playback devices for the playback of content from one or more sources such as other network devices. These multi-media or playback devices utilize a protocol to establish a communication with the source. For example, the multi-media or playback devices can utilize the discovery and launch (DIAL) protocol which is a mechanism for discovering and launching applications on a single subnet, such as a home network. The DIAL protocol relies on universal plug and play (UPnP), simple service discovery protocol (SSDP), and hypertext transfer protocol (HTTP). The DIAL protocol does not require a pairing between devices but rather enables second screen devices, such as a tablets, a computer, a mobile phone, etc., to send content to first screen devices, such as televisions, playback devices, etc. set-top boxes, etc.

The DIAL protocol, though, does not present a network device that is the best, preferred or desired device, such as the device with the best features or capabilities) in any particular order to a user. That is, once a network device is discovered that network device may fall in alphabetical order in a list of "friendly names" (the identifier associated with a network device in response to the DIAL discovery request) presented to a user without any consideration as to the features or capabilities of the network device even though the network device should be preferred or have a higher priority than other devices that were discovered and listed ahead of the network device. A user may pick the first device listed as opposed to the preferred device or the device with the features/capabilities that are more conducive to playback of the content leading to an inferior user experience.

Generally, to resolve the above-described problem, a user must scroll through a list of discovered devices or simply use trial and error to find the appropriate device or a user must scroll through a list of discovered devices and pick a device without knowing features or capabilities of the device. Further, suppliers have few options for promoting devices with enhanced features/capabilities. Therefore, there is a need to provide a format function such that the friendly name associated with the network device is positioned at the top or near-the-top of a selection list presented to a user and to provide additional information about a network device in a response to a request from a client device.

SUMMARY

The DIAL protocol provides for second screen devices or applications of a second screen devices to discover and launch a first screen application on a first screen device. A first screen device can include a television, a Blu-ray player, a set-top box, etc. A second screen device can include a smartphone, a tablet, etc. A DIAL server is a network device that implements the server side of the DIAL protocol. A first screen device is usually a DIAL server. A DIAL client is a device that can discover and launch applications on a DIAL server and is usually a second screen device. A DIAL client discovers DIAL servers on the network using a DIAL service discovery or a discovery request using a UPnP SSDP protocol. A device description associated with the discovery request is received as a header provided in a HTTP response to a HTTP request. The device description includes a friendly name associated with the discovered device. This friendly name can be presented to the user in a list and/or menu of discovered network devices that identify as a DIAL server or a first screen device. Previously, a user would be presented with an alphabetical list of the friendly names. The order of the friendly names in the list would have no correlation to the supplier and/or the features/capabilities of the network device associated with the friendly name. The novel solution(s) discussed provide a first screen device that can format the associated friendly name such that the friendly name is positioned at the top of the list for presentation to the user. The novel solution(s) discussed provide a first screen device that can format the associated friendly name and provide additional information about the features and/or capabilities of the first screen device including, but not limited to one or more applications on the first screen device. In this way, the network device can be promoted to the user which enhances the visibility of the network device to the user and increases the probability that the network device with the preferred features and capabilities will be selected by the user.

An aspect of the present disclosure provides a first screen device of a network utilizing a discovery and launch (DIAL) protocol for providing a first screen device friendly name. The first screen device comprises a memory storing one or more computer-readable instructions and a processor configured to execute the one or more computer-readable instructions to receive a DIAL discovery request from a DIAL client device, format the first screen device friendly name based on a device name associated with the first screen device, wherein formatting the first screen device friendly name comprises prefixing the device name with a character, and provide the first screen device friendly name to the DIAL client device.

In an aspect of the present disclosure, the character is a space character.

In an aspect of the present disclosure, the processor is configured to execute one or more further instructions to scan the network for one or more friendly names, wherein the formatting the first screen device friendly name is based, at least in part, on the one or more friendly names.

In an aspect of the present disclosure, the processor is configured to execute one or more further instructions to determine a prefix associated with the one or more friendly names and prefix an additional character to the device name, based, at least in part, on the one or more friendly names.

In an aspect of the present disclosure, the character and the additional character comprise a space character.

In an aspect of the present disclosure, the processor is configured to execute one or more further instructions to fetch a DIAL application status associated with one or more DIAL server devices, wherein the DIAL service devices implement the DIAL protocol, determine one or more features of the one or more DIAL server devices and the first screen device based, at least in part, on the DIAL application status associated with the one or more DIAL server devices and the first screen device, compare the one or more features of the one or more DIAL server devices and the first screen device, and transmit a notification to a user of the DIAL client device with a recommendation based on the comparison.

In an aspect of the present disclosure, the transmitting the notification comprises sending the notification to any of an output device coupled to the first screen device, a consumer electronics control (CEC) enabled device, a Bluetooth enabled device, or a combination thereof.

An aspect of the present disclosure provides a method for providing a first screen device friendly name of a first screen device to a DIAL client device using a DIAL protocol, the method comprising receiving a DIAL discovery request from a DIAL client device, formatting the first screen device friendly name based on a device name associated with the first screen device, wherein formatting the first screen device friendly name comprises prefixing the device name with a character, and providing the first screen device friendly name to the DIAL client device.

In an aspect of the present disclosure, the character is a space character.

In an aspect of the present disclosure, the processor is configured to execute one or more further instructions to scanning the network for one or more friendly names, wherein the formatting the first screen device friendly name is based, at least in part, on the one or more friendly names.

In an aspect of the present disclosure, the method further comprises determining a prefix associated with the one or more friendly names and prefixing an additional character to the device name, based, at least in part, on the one or more friendly names.

In an aspect of the present disclosure, the character and the additional character comprise a space character.

In an aspect of the present disclosure, the method further comprises fetching a DIAL application status associated with one or more DIAL server devices, wherein the DIAL service devices implement the DIAL protocol, determining one or more features of the one or more DIAL server devices and the first screen device based, at least in part, on the DIAL application status associated with the one or more DIAL server devices and the first screen device, comparing the one or more features of the one or more DIAL server devices and the first screen device, and transmitting a notification to a user of the DIAL client device with a recommendation based on the comparison.

In an aspect of the present disclosure, the transmitting the notification comprises sending the notification to any of an output device coupled to the first screen device, a consumer electronics control (CEC) enabled device, a Bluetooth enabled device, or a combination thereof.

An aspect of the present disclosure provides a non-transitory computer-readable medium of a first screen device storing one or more instructions for providing a friendly name associated with the first screen device discoverable on a network. The program when executed by a processor of the first screen device, causes the first screen device to perform one or more operations including the steps of the methods described above.

The above-described network device(s) or electronic apparatus(es), such as access point devices, extender access point devices, client devices (for example, a DIAL client device or a second screen device, a DIAL server device or first screen device), and any other network devices, may be implemented as any of a residential network access point device, an electronic device (for example, a mobile phone, a computing device such as a notebook computer, or both) according to some example embodiments.

Thus, according to various aspects of the present disclosure described herein, it is possible to present a preferred friendly name associated with a specific first screen device to a user in a list of friendly names associated with one or more network devices connected to the network in a format that causes the preferred friendly name to be advantageously presented at the top of the list of all of the discovered friendly names associated with the one or more network devices.

An aspect of the present disclosure provides a first screen device of a network utilizing a discovery and launch (DIAL) protocol for formatting a response to a DIAL request. The first screen device comprises a memory storing one or more computer-readable instructions and a processor configured to execute the one or more computer-readable instructions to receive the DIAL request from a DIAL client device, format the response to the DIAL request, wherein formatting the response comprises providing one or more capabilities associated with the first screen device, and sending the response to the DIAL client device.

In an aspect of the present disclosure, the one or more capabilities comprise any of a digital rights media (DRM) capability, a video format capability, an audio format capability, a high-bandwidth digital content protection (HDCP) capability, a trusted execution environment (TEE) capability, or a combination thereof.

In an aspect of the present disclosure, the DIAL request is a DIAL discovery request.

In an aspect of the present disclosure, providing one or more capabilities associated with the first screen device comprises inserting a capability header in the response, wherein the capability header includes a uniform resource locator (URL) associated with the DIAL server device, wherein a file identified by the URL includes one or more capabilities associated with the DIAL server device.

In an aspect of the present disclosure, the processor is configured to execute one or more further instructions to receive, from the DIAL client device, a request to launch an application at the first screen device, wherein the application requires at least one of the one or more capabilities.

In an aspect of the present disclosure, the first screen device comprises a universal plug and play (UPnP) server, and wherein the DIAL request is a DIAL device description request, and wherein formatting the response to the DIAL request comprises formatting a UPnP device description to include a capabilities tag and one or more capabilities attributes associated with the capabilities tag, wherein the one or more capability attributes identify the one or more capabilities.

In an aspect of the present disclosure, the one or more attributes comprise any of a digital rights media (DRM) attribute, a video format attribute, an audio format attribute, a high-bandwidth digital content protection (HDCP) attribute, a trusted execution environment (TEE) attribute, or a combination thereof.

An aspect of the present disclosure provides a method for formatting, by a first screen device, a response to a DIAL client device using a DIAL protocol, the method comprising receiving the DIAL request from a DIAL client device, formatting the response to the DIAL request, wherein formatting the response comprises providing one or more capabilities associated with the first screen device, and sending the response to the DIAL client device.

In an aspect of the present disclosure, the method further comprises the one or more capabilities comprise any of a digital rights media (DRM) capability, a video format capability, an audio format capability, a high-bandwidth digital content protection (HDCP) capability, a trusted execution environment (TEE) capability, or a combination thereof.

In an aspect of the present disclosure, the DIAL request is a DIAL discovery request.

In an aspect of the present disclosure, providing one or more capabilities associated with the first screen device comprises inserting a capability header in the response, wherein the capability header includes a uniform resource locator (URL) associated with the DIAL server device, wherein a file identified by the URL includes one or more capabilities associated with the DIAL server device.

In an aspect of the present disclosure, the method further comprises receiving, from the DIAL client device, a request to launch an application at the first screen device, wherein the application requires at least one of the one or more capabilities.

In an aspect of the present disclosure, the first screen device comprises a universal plug and play (UPnP) server, and wherein the DIAL request is a DIAL device description request, and wherein formatting the response to the DIAL request comprises formatting a UPnP device description to include a capabilities tag and one or more capabilities attributes associated with the capabilities tag, wherein the one or more capability attributes identify the one or more capabilities.

In an aspect of the present disclosure, the one or more attributes comprise any of a digital rights media (DRM) attribute, a video format attribute, an audio format attribute, a high-bandwidth digital content protection (HDCP) attribute, a trusted execution environment (TEE) attribute, or a combination thereof.

An aspect of the present disclosure provides a non-transitory computer-readable medium of first screen device stores one or more instructions for formatting a discovery and launch (DIAL) response to a DIAL client device. The one or more instructions when executed by a processor of the first screen device, cause the first screen device to perform one or more operations including the steps of the methods described above.

The above-described network device(s) or electronic apparatus(es), such as access point devices, extender access point devices, client devices (for example, a DIAL client device or a second screen device, a DIAL server device or first screen device), and any other network devices, may be implemented as any of a residential network access point device, an electronic device (for example, a mobile phone, a computing device such as a notebook computer, or both) according to some example embodiments.

Thus, according to various aspects of the present disclosure described herein, it is possible to present a preferred friendly name associated with a specific first screen device to a user in a list of friendly names associated with one or more network devices connected to the network in a format along with additional information associated with the features or capabilities of the first screen device that causes the preferred friendly name to be advantageously presented at the top of the list of all of the discovered friendly names associated with the one or more network devices and for the features and/or capabilities of the preferred first screen device to be sent to the second screen device such that the preferred first screen device is more likely to be selected for playback of a selected asset.

BRIEF DESCRIPTION OF DRAWINGS

In the drawings, like reference numbers generally indicate identical, functionally similar, and/or structurally similar elements.

FIGS. 3A and 3B illustrate presentation one or more friendly names associated with various first screen devices, according to one or more aspects of the present disclosure;

FIGS. 4A, 4B, and 4C illustrate presentation of one or more friendly names associated with various first screen devices, according to one or more aspects of the present disclosure;

FIGS. 6A, 6B, and 6C illustrate communication of information between a DIAL client device and a DIAL server, according to one or more aspects of the present disclosure.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

It should be appreciated that various example embodiments of inventive concepts disclosed herein are not limited to specific numbers or combinations of devices, and there may be one or multiple of some of the aforementioned electronic apparatuses in the network environment, which may itself consist of multiple communication networks and various known or future developed wireless connectivity technologies, protocols, devices, and the like.

Figure 1:
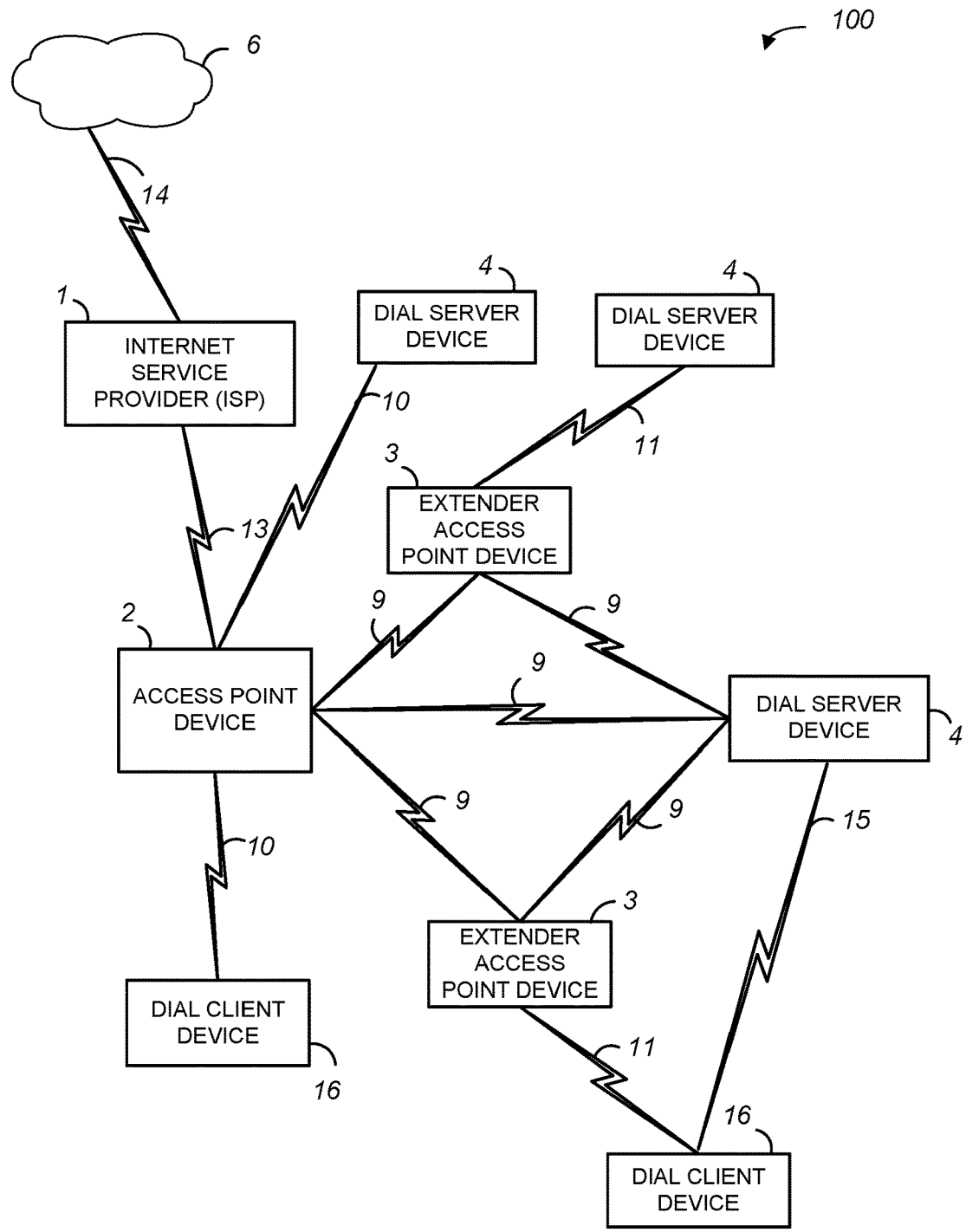
FIG. 1 is a schematic diagram of a network environment, according to one or more aspects of the present disclosure.

As shown in FIG. 1, the main elements of the network environment 100 include a network comprising an access point device 2 connected to an Internet 6 via an Internet Service Provider (ISP) 1 and also connected to different wireless devices or network devices such as one or more wireless extender access point devices 3, one or more DIAL server devices 4, and one or more DIAL client devices 16. The network environment 100 shown in FIG. 1 includes wireless network devices (e.g., extender access point devices 3, one or more DIAL server devices 4, and one or more DIAL client devices 16) that may be connected in one or more wireless networks (e.g., private, guest, iControl, backhaul network, or Internet of things (IoT) network) within the network environment 100. Additionally, there could be some overlap between wireless devices (e.g., extender access point devices 3, one or more DIAL server devices 4, and one or more DIAL client devices 16) in the different networks. That is, one or more network or wireless devices could be located in more than one network. For example, the extender access point devices 3 could be located both in a private network for providing content and information to one or more DIAL server devices 4 and one or more DIAL client devices 16 and also included in a backhaul network or an iControl network.

Starting from the top of FIG. 1, the ISP 1 can be, for example, a content provider or any computer for connecting the access point device 2 to the Internet 6. For example, Internet 6 can be a cloud-based service that provides content or an asset accessible via ISP 1. The connection 14 between the Internet 6 and the ISP 1 and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for providing content received from the ISP 1 to one or more network devices (e.g., wireless extender access point devices 3, DIAL server devices 4, and DIAL client devices 16) in the network environment 100. It is also contemplated by the present disclosure that the access point device 2 can include the function of, but not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2, the wireless extender access point devices 3, the DIAL server devices 4, and the DIAL client devices 16 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. In one or more embodiments, one or more network devices (such as any of the one or more extender access point devices 3, the one or more DIAL server devices 4, the one or more DIAL client devices 16, or a combination thereof) communicate over one or more connections 9, 10, 11 and/or 15 using UPnP SSDP and/or HTTP.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, the one or more DIAL server devices 4 and/or the one or more DIAL client devices 16, which may be out of range of the access point device 2. The extender access point devices 3 can also receive signals from the DIAL server devices 4 and/or the DIAL client deices 16 and rebroadcast the signals to the access point device 2, or any other network device.

The connection 11 between the extender access point devices 3, the DIAL server devices 4, and/or the DIAL client devices 16 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The DIAL server devices 4 are network devices that can implement the server side of the DIAL protocol. In one or more embodiments, the DIAL server device 4 is a first screen device. A first screen device can be, for example, a television, a set-top box (STB) (such as an IP/QAM STB), a disc player (such as a Blu-ray player), a game console, digital video recorder, a network device that provides playback of content, or a combination thereof. In one or more embodiments, the DIAL server device 4 includes hardware, software or both to perform one or more functions of a DIAL client device 16, for example, a DIAL discovery request.

The DIAL client devices 16 are network devices that can implement the client side of the DIAL protocol. For example, the DIAL client devices 16 can discover one or more DIAL server devices 4 and can request to launch one or more applications at any one or more discovered DIAL server devices 4. In one or more embodiments, the DIAL client device 16 is a second screen device. A second screen device can be, for example, a smartphone, a computing device (such as a tablet computer, a laptop computer, a notebook computer, a desktop computer, etc.), any other personal computing device, or a combination thereof.

The connection 10 between the access point device 2 and the DIAL client device 16 and/or the DIAL server device 4 can be implemented through a wireless connection similar or the same as that for connections 9 and 10. The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. One or more of the connections 10 can also be a wired Ethernet connection.

In one or more embodiments, any one or more of the DIAL server device 4 and the DIAL client device 16 can be connected to each other and/or any one or more network devices over a connection 15. Connection 15 can be similar to or the same as any of connections 9, 10 and/or 11. Connection 15 supports at least UPnP SSDP and HTTP.

A detailed description of the exemplary internal components of the DIAL server device 4 and the DIAL client device 16 shown in FIG. 1 will be provided in the discussion of FIG. 2. However, in general, it is contemplated by the present disclosure that the DIAL server device 4 and the DIAL client device 16 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the DIAL server device 4 and the DIAL client device 16 may be adapted to execute any operating system, including Linux, UNIX, Windows, MacOS, DOS, and ChromOS as well as virtual machines adapted to virtualize execution of a particular operating system, including customized and proprietary operating systems. The DIAL server device 4 and the DIAL client device 16 are further equipped with components to facilitate communication with other computing devices or network devices over the one or more network connections to local and wide area networks, wireless and wired networks, public and private networks, and any other communication network enabling communication in the network environment 100.

Figure 2A:
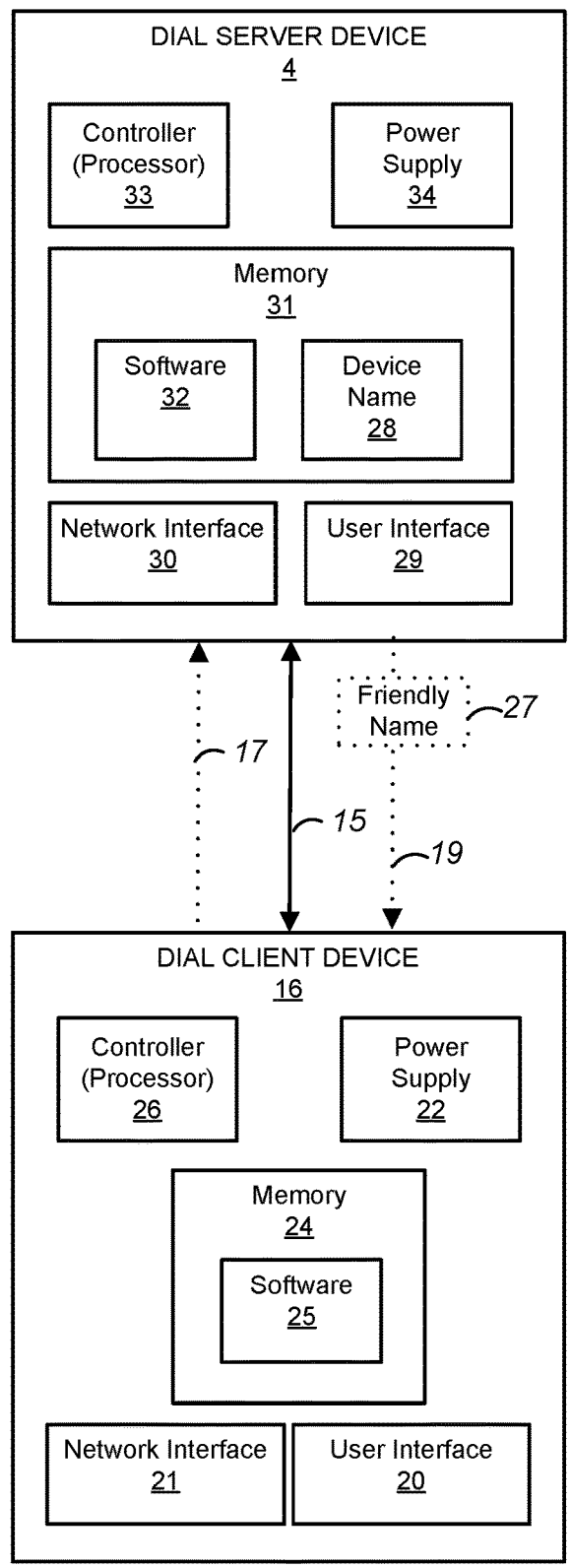
FIG. 2A is a more detailed block diagram illustrating various components of an exemplary DIAL client device and DIAL server device implemented in the network environment of FIG. 1, according to one or more aspects of the present disclosure.
Figure 2B:
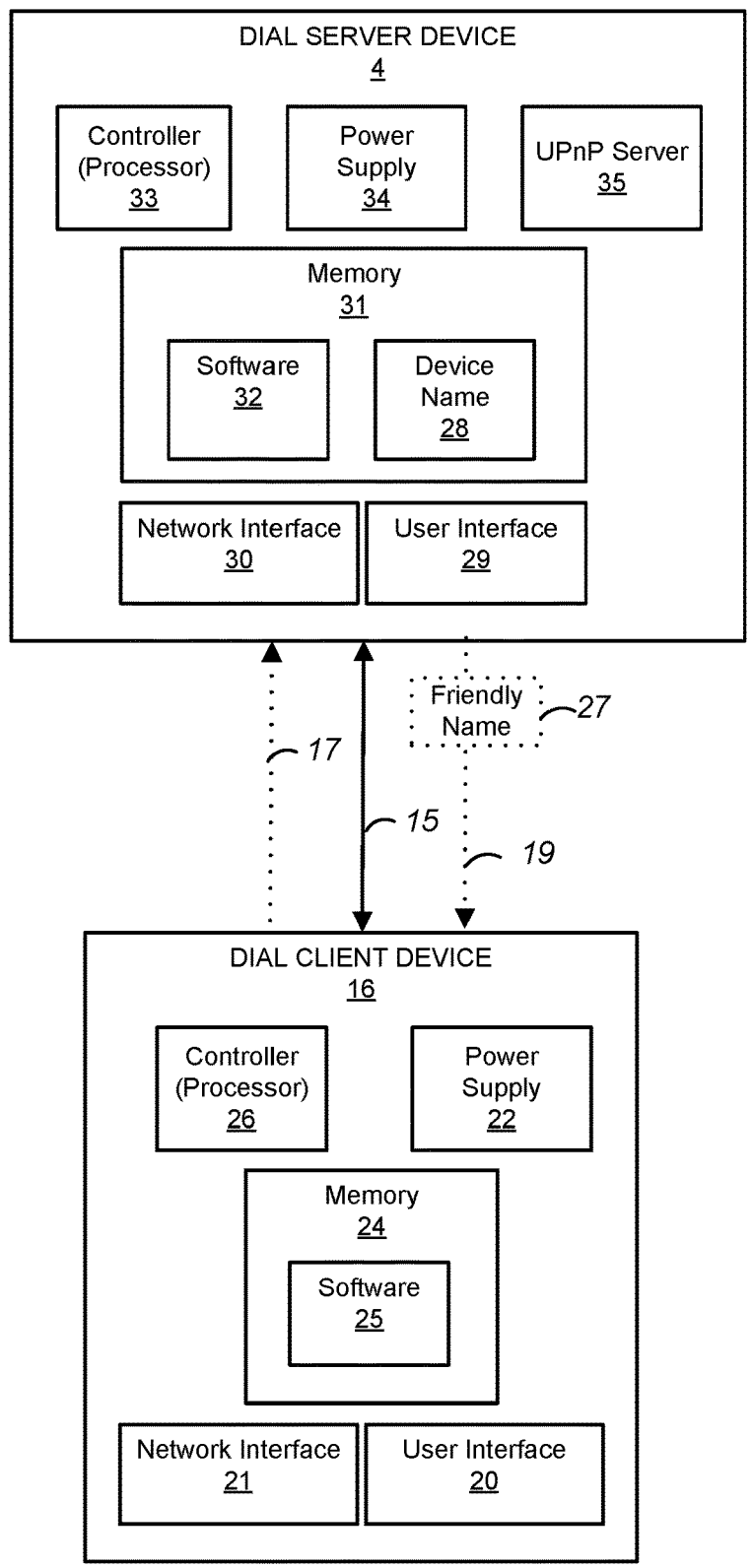
FIG. 2B is a more detailed block diagram illustrating various components of an exemplary DIAL client device and DIAL server device implemented in the network environment of FIG. 1, according to one or more aspects of the present disclosure.

FIGS. 2A and 2B are a more detailed block diagram illustrating various components of an exemplary DIAL server device 4 and the DIAL client device 16 implemented in the network environment 100 of FIG. 1, according to one or more aspects of the present disclosure.

Although FIGS. 2A and 2B shows only one DIAL server device 4 and only one DIAL client device 16, these network devices shown in the figure are meant to be representative of the other DIAL server devices 4 and the DIAL client devices 16 of a network system, for example, network environment 100 shown in FIG. 1. Similarly, the connection 15 between the DIAL server device 4 and the DIAL client device 16 in FIGS. 2A and 2B is meant to be an exemplary connection and is not meant to indicate all possible connections between the DIAL server device 4 and the DIAL client device 16. Additionally, it is contemplated by the present disclosure that the number of DIAL server devices 4 and the number of DIAL client devices 16 is not limited to the number DIAL server devices 4 and the DIAL client devices 16 shown in FIGS. 1 and 2A-2B. Further, the present disclosure contemplates that DIAL server device 4 can be connected directly and/or indirectly to a DIAL client device 16 via any one or more connections, for example, as discussed with reference to FIG. 1.

Now referring to FIG. 2A, the DIAL server device 4 includes a power supply 34, a user interface 29, a network interface 30, a memory 31, and a controller 33. In FIG. 2B, the DIAL server device 4 includes a power supply 34, a user interface 29, a network interface 30, a memory 31, a controller 33, and a UPnP server 35. In FIGS. 2A and 2B, the DIAL server device 4 is a first screen device. In one or more embodiments, the DIAL server device 4 is coupled to a first screen device that includes a display.

The power supply 34 supplies power to the internal components of the DIAL server device 4 through, for example, an internal bus. The power supply 34 can be a self-contained power source such as a battery pack with an interface to be powered through an electrical charger connected to an outlet (e.g., either directly or by way of another device). The power supply 34 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the DIAL server device 4, for example, for playback of content received at the DIAL server device 4, for example, content from or directed to be sent from the DIAL client device 16.

The network interface 30 can include, but is not limited to, various network cards, interfaces, and circuitry implemented in software and/or hardware to enable communications with the access point device 2 and the extender access point device 3 using any one or more of the communication protocols in accordance with connection 15 (e.g., as discussed with reference to FIG. 1) and/or any other connection. For example, DIAL server device 4 can be directly or indirectly connected or coupled to the DIAL client device 16 via any one or more connections, (e.g., as discussed with reference to FIG. 1).

The UPnP server 35 provides access to information associated with the DIAL server device 4, including, but not limited to, a feature and/or capability, for example, any of one or more applications or software 32 (such as an executable program, an application programming interface (API), a driver, a BIOS, etc.), one or more values indicative of a version of one or more applications or software 32, a type of connectivity, one or more accessible external devices, and any combination thereof associated with DIAL server device 4 or hosted by DIAL server device 4 that provide playback of an asset or content. In one or more embodiments, UPnP server 35 can also be and/or include an HTTP server. In one or more embodiments, the information of UPnP sever 35 includes, but is not limited to, a device description (such as metadata) that includes, for example, a list of UPnP services available at the DIAL server device 4, a friendly name, a uniform resource locator (URL) that is indicative of a DIAL REST service component, any other information associated with the DIAL server device 4, or any combination thereof.

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for operations of the DIAL server device 4 in accordance with the embodiments described in the present disclosure. For example, software 32 can include one or more instructions for responding to a DIAL discovery request from a DIAL client device 16, querying the network for one or more friendly names associated with one or more other network devices, for example, one or more other first screen devices and/or DIAL server devices, formatting and/or sending a response to a DIAL discovery request (for example, an M-SEARCH request), formatting and/or sending a response to a HTTP request, or any combination thereof, such as formatting responses as discussed with reference to FIGS. 6A-6C. In one or more embodiments, memory 31 can store a device name 28. The device name 28 can be a unique identifier associated with the DIAL server device 4. The device name 28 can include any one or more alphanumeric characters that can be displayed to a user, for example, of a DIAL client device 16. In one or more embodiments, the software 32 sends or transmits the device name 28 in response to a DIAL discovery request (for example, an M-SEARCH request) from the DIAL client device 16.

The controller 33 controls the general operations of the DIAL server device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 in accordance with the embodiments described in the present disclosure. Communication between any one or more components of DIAL server device 4 may be established using an internal bus. In one or more embodiments, the controller or processor 33 executes one or more instructions of software 32 to respond to a DIAL discovery request and/or to format a device name 28 in accordance with one or more aspects of the present disclosure.

The DIAL client device 16 includes one or more components for providing content received from the content provider (ISP) 1 to network or wireless devices (e.g., extender access point devices 3, client devices 4) in the system. The DIAL client device 16 includes a power supply 22, a user interface 20, a network interface 21, a memory 24, and a controller 26. In FIG. 2, the DIAL client device 4 is a second screen device. In one or more embodiments, the DIAL server device 4 is coupled to a second screen device that includes a display.

The user interface 20 can include, but is not limited to, push buttons, a keyboard, a keypad, an LCD, a TFT, an LED, an HD or other similar display device including a display device having touch screen capabilities so as to allow interaction between a user and the DIAL client device 16. In one or more embodiments, the user interface 20 provides an interface, such as a command-line interface, a graphical user interface, an interface output port for connection to a display, and/or another type of user interface, that allows a user to view one or more of a list or menu, for example, a list or menu of friendly names of one or more network devices obtained, for example, via one or more DIAL discovery requests.

The network interface 21 may include various network cards, and circuitry implemented in software and/or hardware to enable communications with any one or more network devices including, but not limited to, DIAL server device 4 whether directly or indirectly using the communication protocols in accordance with connection 15 (e.g., as described with reference to FIG. 1) and/or any other connections. Additionally, the various network cards, interfaces, and circuitry of the network interface 21 enable communications with ISP 1, whether directly or indirectly, so as to obtain content from Internet 6.

The power supply 22 supplies power to the internal components of the DIAL client device 16 through an internal bus. The power supply 22 can be connected to an electrical outlet (e.g., either directly or by way of another device) via a cable or wire.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the DIAL client device 16, for example, sending a DIAL discovery request to one or more network devices such as DIAL server device 4 and/or receiving friendly names from one or more network devices such as DIAL server device 4. In one or more embodiments, the DIAL client device 16 can have content stored locally in memory 24.

The controller 26 controls the general operations of the DIAL client device 16. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for discovering one or more network devices, such as DIAL server device 4. Communication between any one or more of the components of the DIAL client device 16 may be established using an internal bus. The controller 26 may also be referred to as a processor, generally.

In one or more embodiments, the DIAL client device 16 is a second screen device where the processor 26 executes one or more instructions of software 25 that are stored in the computer-readable memory 24 so as to send a DIAL discovery request 17 via a connection 15, for example, to any one or more network devices connected to a network, for example, as discussed with reference to FIG. 1. The DIAL discovery request can be received by a DIAL server device 4. A processor 33 can execute one or more instructions of a software 32 stored in a computer-readable memory 31 so as to retrieve a device name 28 associated with the DIAL server device 4. The software 32 can also format the device name 28 according to one or more aspects of the present disclosure, for example, as discussed with FIGS. 3A, 3B, 4A, 4B, and 4C. The DIAL server device 4 can send or transmit the formatted device 28 as a friendly name 27, for example, as part of a response 19 via a connection to the network, such as connection 15.

In one or more embodiments, the software 32 can include one or more applications, drivers, utilities and/or any other resources required for playback of an asset or content. In one or more embodiments, one or more parameters, one or more features, one or more capabilities, any other resource, or a combination thereof of the software 32 and/or any one or more other computer-readable medium instructions can be periodically revised, loaded, updated or upgraded, for example, a version update to and/or new installation of one or more video/audio encoders/decoders (CODECs) (such as any video format including, but not limited to, any of V9 4K, H264 4K, H264 1080p, etc. and/or any audio format including, but not limited to, any of advanced audio coding (AAC), Opus, etc.), one or more digital rights management (DRM) tools, one or more security features, a trusted execution environment (TEE) technology, high-bandwidth digital content protection (HDCP) technology, any other content playback functionality, or a combination thereof can be received and applied at the DIAL server device 4. The DIAL client device 16 is generally not aware of the features and/or capabilities associated with a DIAL server device 4.

FIGS. 3A and 3B illustrate the presentation of one or more friendly names 27 associated with a first screen device (such as DIAL server device 4), according to one or more aspects of the present disclosure. The friendly name 27 can be presented in a list or a menu of a user interface of a second screen device (such as user interface 20 of a DIAL client device 16). The friendly name 27 can comprise any one or more alphanumeric characters, for example, any one or more American Standard Code for Information Interchange (ASCII) characters. FIG. 3A illustrates a list or menu of friendly names 27 associated with various first screen devices. Typically, a second screen device orders or displays the received friendly names 27 alphabetically. For example, a second screen device can send a DIAL discovery request 17 to one or more first screen devices to obtain the one or more friendly names 27 associated with the one or more first screen devices and presents the received one or more friendly names 27 in alphabetical order as illustrated in FIG. 3A. The friendly names 27 presented in FIG. 3A have not been formatted or altered, for example, the device name 28 of the associated first screen device is sent as the friendly name 27 in a response 19 to the DIAL discovery request 17 without any additional characters added as a prefix.

FIG. 3B illustrates a list or menu of friendly names 27 associated with the first screen devices of FIG. 3A except a/one device name 28 has been formatted so as to place the corresponding friendly name at the top of the list. For example, a first screen device identified as "Z Brand Preferred DIAL Server" receives a DIAL discovery request 17 from a second screen device (for example, a DIAL client device 16). In response, the first screen device formats the device name 28 of "Z Brand Preferred DIAL Server" according to one or more aspects of the present disclosure. In the example of FIG. 3B, the device name 28 is formatted to include a single character, for example, a space character, as a prefix to the device name 28 such that the device name 28 becomes the friendly name 27 of "␣Z Brand Preferred DIAL Server". Formatting the device name 28 with a space character (represented as "␣" in FIG. 3B), for example, ASCII hexadecimal code $20_{16}$, results in the corresponding or associated friendly name 27 being positioned at the top of the list of the discovered friendly names from the one or more network devices that respond to the DIAL discovery request 17 from the first screen device. As shown in FIG. 3B, the friendly name "␣Z Brand Preferred DIAL Server" associated with a preferred first screen device is positioned at the top of the list above all of the other friendly names 27 in contrast to at the bottom of the list as shown in FIG. 3A. Generally, adding a space character as a prefix to the device name 28 is not noticeable by a user. In this way, a first screen device can become a preferred device without requiring any software update to the second screen device. That is, the second screen device will automatically order the friendly names 27 alphanumerically with the formatted device name 28 prefixed with a space character being at the top of the list or menu.

FIGS. 4A, 4B and 4C illustrate the presentation of one or more friendly names 27 associated with one or more first screen devices (such as one or more DIAL server devices 4), according to one or more aspects of the present disclosure. FIGS. 4A-4C are similar to FIGS. 3A-3B. FIG. 4A illustrates a list of friendly names 27 associated with one or more first screen devices ordered alphabetically where a first friendly name 27 begins with a space character (represented as "␣"). FIGS. 4B and 4C illustrates an example implementation of one or more embodiments of the present disclosure such that the friendly name 27 associated with a preferred first screen device identified as "Z Brand Preferred DIAL Server" is formatted with one or more characters as a prefix so as to cause this preferred first screen device to be positioned at the top of the list. For example, in FIG. 4B, the friendly name 27 associated with the preferred first screen device ("Z Brand Preferred DIAL Server") is formatted by the first screen device to include two space characters (represented as "␣␣") so as to cause the preferred first screen device to be positioned at the top of the list of friendly names 27 presented to a user of the second screen device. Similarly, in FIG. 4C the preferred first screen device ("Z Brand Preferred DIAL Server") is formatted by the first screen device to include the "A" character followed by a space character "␣" so as to cause the preferred first screen device to be positioned at the top of the list as discussed with reference to FIG. 4B.

In one or more embodiments, the friendly name 27 can be formatted to include as a prefix any one or more alphanumeric characters, one or more special characters, or a combination thereof. Additionally, while FIGS. 3A-4C list four friendly names 27 associated with any one or more first screen devices, the present disclosure contemplates any number of friendly names 27 associated with any one or more first screen devices discoverable via a DIAL discovery request 17. In one or more embodiments, a first screen device (for example, a DIAL server device 4) can discover any one or more friendly names 27 associated with any one or more associated first screen devices and can format the device name 28 of the first screen device to form a friendly name 27 based, at least in part, on the discovered one or more friendly names 27 so as to ensure that the formatted friendly name 27 is positioned at the top of a list of friendly names 27 presented to a user at a second screen device. For example, before responding to a DIAL discovery request, the first screen device can scan the network for friendly names 27 associated with other first screen devices to determine a format to ensure that the friendly name 27 sent by the first screen device in response to the DIAL discovery request will be formatted so as to be positioned at the top of the list or menu of the second screen device.

Figure 5:
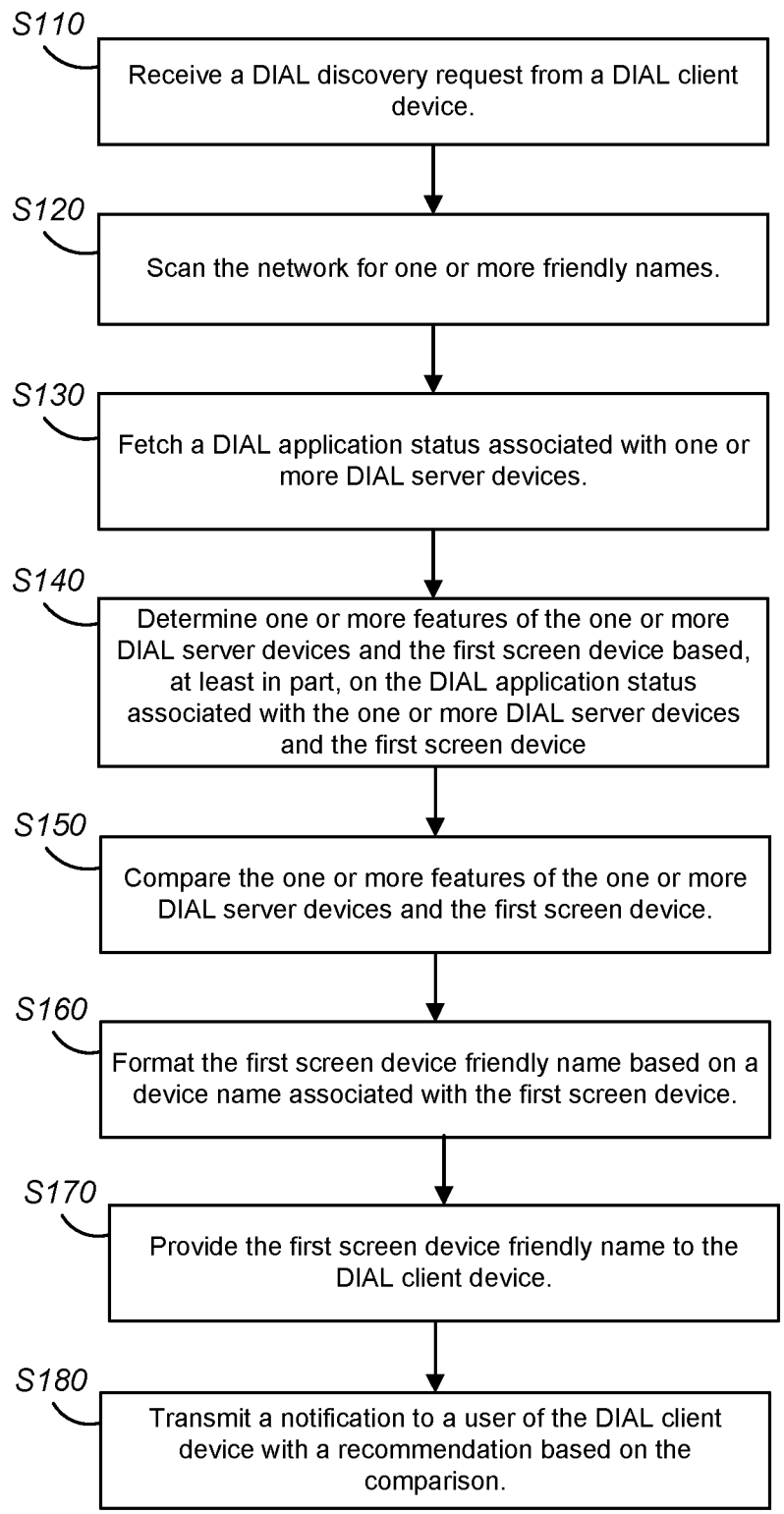
FIG. 5 is a flow chart illustrating a method for formatting a friendly name associated with a first screen device, according to one or more aspects of the present disclosure.

FIG. 5 is a flow chart illustrating a method for configuration of one or more network devices, according to one or more aspects of the present disclosure.

The DIAL server device 4 may be programmed with one or more instructions (e.g., HNC controller instructions), such as software 32, for formatting a DIAL response, that when executed by a processor or controller 33 causes the DIAL server device 4 to perform one or more operations, such as formatting a friendly name 27 of the DIAL server device 4, according to one or more aspects of the present disclosure. In one or more embodiments, the DIAL server device 4 can be referred to as a first screen device. In FIG. 5, it is assumed that any one or more of the devices include their respective controllers and their respective software stored in their respective memories, as discussed above in connection with FIGS. 1-4, which when executed by their respective controllers perform the functions and operations in accordance with the example embodiments of the present disclosure (e.g., including formatting of DIAL response).

The DIAL server device 4 comprises a controller 33 that executes one or more computer-readable instructions, stored on a memory 31, that when executed perform one or more of the operations of steps S110-S180. In one or more embodiments, the one or more instructions can be one or more software applications, for example, one or more software 32. While the steps S110-S180 are presented in a certain order, the present disclosure contemplates that any one or more steps can be performed simultaneously, substantially simultaneously, repeatedly, in any order or not at all (omitted).

At step S110, a DIAL server device 4, such as a preferred first screen device, coupled to a network receives a DIAL discovery request from a DIAL client device 16, for example, a second screen device, coupled to the network. The DIAL server device 4 can be coupled directly and/or indirectly to the DIAL client device 16.

At step S120, the DIAL server device 4 scans the network for one or more friendly names associated with one or more network devices coupled to the network. In one or more embodiments, the one or more network devices can include one or more other DIAL server devices 4, one or more other first screen devices, or a combination thereof. For example, the DIAL server device 4 can include hardware, software or both to perform one or more operations associated with the DIAL protocol, such as a DIAL client device 16. In one or more embodiments, the DIAL server device 4 scans the network periodically, at timed intervals, after receiving a DIAL discovery request, at any other time, in response to a change in network (for example, an additional network device being added to the network), and any combination thereof. For example, step S120 can occur prior to step S110.

At step S130, the DIAL server device 4 fetches a DIAL application status associated with the one or more network devices. For example, the DIAL service device 4 can utilize DIAL service discovery to receive current running application status, for example, or any other information associated with any of the one or more of the network devices.

At step S140, the DIAL server device 4 determines one or more features of the one or more network devices and the first screen device based, at least in part, on the DIAL application status associated with the one or more network devices and the first screen device. The DIAL application status provides the DIAL server device 4 with information associated with the one or more network devices coupled to the network. For example, the information can include, but is not limited to, any of a model number, a brand name, a feature, a capability, a version of one or more applications, one or more drivers, and/or operating system, an externally connected device, any other detail associated with the one or more network devices. The DIAL server device 4 can retrieve information associated with the one or more network devices, for example, for a cloud resource accessed via access point 2 and/or ISP 1. For example, the DIAL application status can provide the DIAL server device 4 with information that directs the DIAL server device 4 to a uniform resource locator (URL), a cloud repository, a catalog maintained by a service provider, for example, ISP 1, and/or any other resource where features and/or capabilities associated with the network device can be retrieved.

At step S150, the DIAL server device 4 compares the one or more features of the one or more network devices based, at least in part, on the DIAL application status associated with the one or more network devices (for example, the one or more other DIAL server devices 4 and/or one or more other first screen devices) and the DIAL server device 4. The comparison can include a numerical ranking of the features of the one or more network devices and the DIAL server device 4 (for example, the preferred first screen device).

At step S160, the DIAL server device 4 formats the friendly name 27 associated with the DIAL server device 4 based, at least in part, on a device name 28 associated with the DIAL server device 4. The friendly name 27 is formatted to give priority to the DIAL server device 4 such that the friendly name 27 is listed or positioned at the top of a list or menu displayed at a user interface of a second screen device. For example, the friendly name 27 can be formatted as discussed with respect to FIGS. 3A-4C such that a user sees the DIAL server device 4 (for example, the first screen device) as a preferred first screen device as the friendly name 27 is listed first.

At step 170, the DIAL server device 4 (the first screen device) sends the friendly name 27 (the first screen device friendly name) that has been formatted to the DIAL client device 16 (the second screen device) in response to the DIAL discovery request received from the DIAL client device 16 at step S110.

At step S180, the DIAL server device 16 transmits a notification to a user of the DIAL client device 16. The notification includes a recommendation as to the network device (for example, the preferred first screen device, such as DIAL server device 4) that should be selected for playback of an asset based, at least in part, on the comparison of step S150. The notification can be displayed as any of a pop-up, an alert, a message, an input of a user interface, any other notification or any combination thereof. In one or more embodiments, the notification is sent to an output device coupled to the first screen device and/or the second screen device including, but not limited to, a consumer electronics control (CEC) enabled device, a Bluetooth enabled device, a voice interface device, a video interface device, a speaker, an HDMI television using CEC options, or a combination thereof. In this way, the user is informed of the network device, for example, a first screen device, that will provide the best QoE for the particular asset selected by the user for casting or playback by a network device connected to the network.

In one or more embodiments, a user selects a video for playback at a second screen device and requests a list of friendly names 27 associated with one or more network devices connected to the network that are discoverable as first screen devices. The list provided to the user can include a friendly name 27 associated with a preferred first screen device (for example, DIAL server device 4) that has been formatted such that the preferred first screen device is at the top of the list of the discovered friendly names 27. The preferred first screen device can also provide a notification to the user that informs the user of one or more first screen devices that are recommended for playback of the selected asset, for example, preferred first screen device, based on one or more features/capabilities associated with the one or more first screen devices. In this way, the preferred first screen device can improve the QoE of the user by notifying the user when the preferred screen device will provide the best quality for playback of the selected asset, placing the friendly name 27 associated with preferred first screen device in an advantageous position in a list of friendly names 27 associated with one or more first screen devices to increase the likelihood or chance that the user will select the friendly name 27 of the preferred first screen device, increase user loyalty to the preferred first screen device, any other market differentiator, or a combination thereof.

In one or more embodiments, any of steps S120-S180 can be performed prior to or any time after the DIAL server device 4 receiving a DIAL discovery request from the DIAL client device 16, for example, the second screen device.

According to some example embodiments of inventive concepts disclosed herein, there are provided novel solutions for formatting a response to a DIAL discovery request. The novel solutions according to example embodiments of inventive concepts disclosed herein provide features that enhance the presentation of one or more first screen devices by including one or more characters as a prefix to the friendly name of a preferred first screen device such that the preferred first screen device (for example, the DIAL server device 4) is presented at the top of a list or menu of available first screen devices at the second screen device (for example, the DIAL client device 16).

Figure 6A:
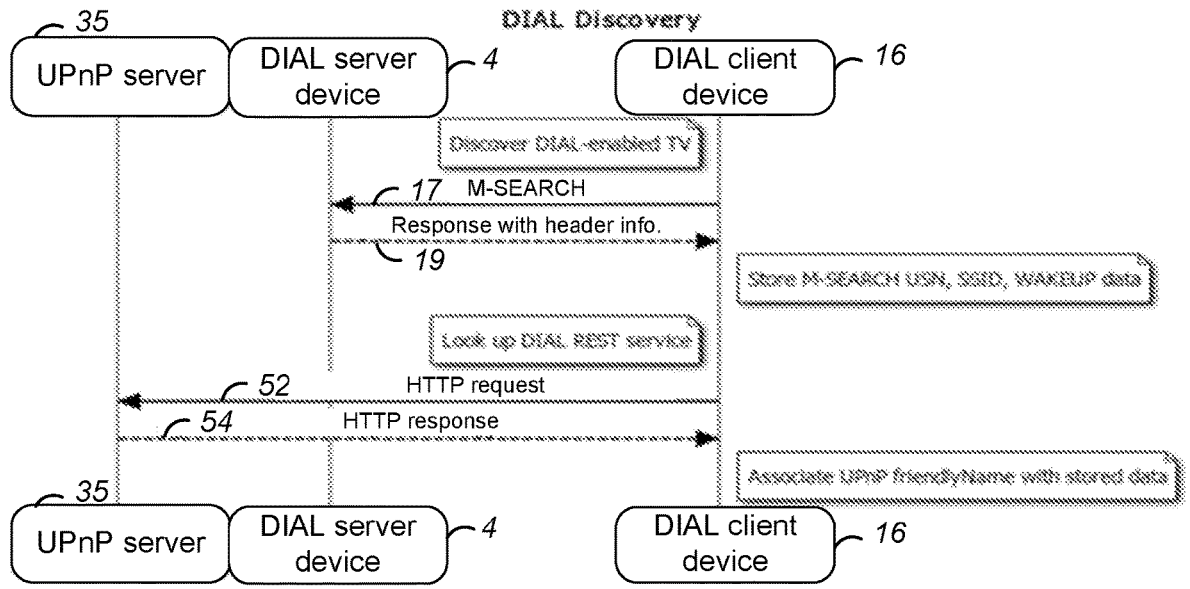
Figure 6B:
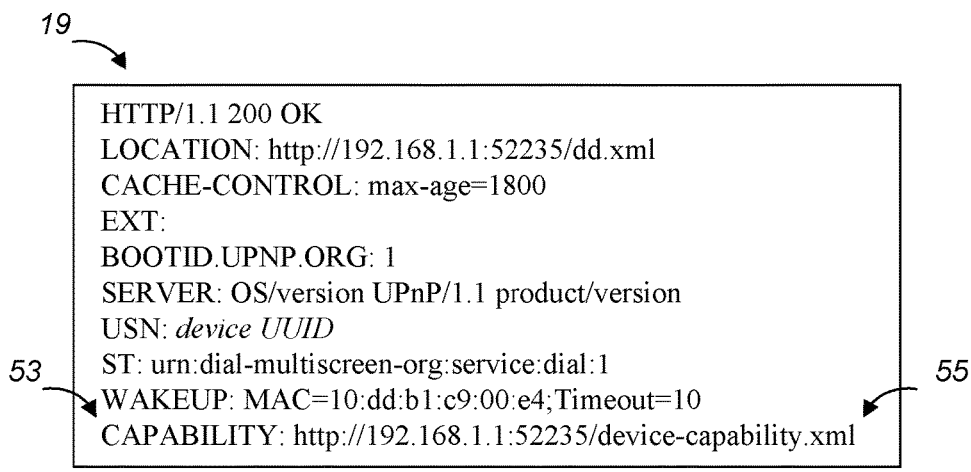

FIGS. 6A, 6B, and 6C illustrate communication of information between a DIAL client device 16 (or a second screen device) and a DIAL server device 4 (or a first screen device), according to one or more aspects of the present disclosure. FIG. 6A illustrates a DIAL discovery request (such as an M-SEARCH request) 17 sent from DIAL client device 16 to a DIAL server device 4. In FIG. 6A, the DIAL server device 4 is a DIAL-enabled television (TV). In response to the M-SEARCH request 17, the DIAL server device 4 sends a response 19 with information associated with the DIAL server device 4, for example, a LOCATION header. According to one or more aspects of the present disclosure, the information can also include one or more capabilities and/or one or more features associated with the DIAL server device 4.

For example, FIG. 6B illustrates an example response, such as response 19, to a DIAL discovery request 17 that extends the information included in a response 19 to a DIAL discovery request 17. As shown in FIG. 6B, a response 19 can include one or more headers, such as a location header (identified as "LOCATION"), a cache-control header (identified as "CACHE-CONTROL"), etc. One or more values can be associated with each header, such as "http://192.168.1.1:52235/dd.xml" associated with the header "LOCATION." In one or more embodiments, the headers can be extended to include additional information. For example, as shown in FIG. 6B the response 19 can be extended to include a capability header 53 (identified as "CAPABILITY" in FIG. 6B). The capability header 53 can be inserted as part of the response 19 and can have an associated capability value 55, for example, a URL associated with the DIAL server device 4 that provides information associated with one or more capabilities/features of the DIAL server device 4, such as one or more applications/software executed and/or hosted by the DIAL server device 4. In the example of FIG. 6B, the capability value 55 associated with the capability header 53 comprises a URL that identifies or directs the DIAL client device 16 to a capability file found at the URL, for example, http://192.168.1.1:52235/device-capability.xml. The capability file, for example, "device-capability.xml", can include one or more capabilities and/or one or more features associated with the DIAL server device 4, for example, one or more applications and/or software executed and/or hosted by the DIAL service device 4. In one or more embodiments, the capability file can be located at a repository accessible via ISP 1. In one or more embodiments, the DIAL server device 4 can update the capability file whenever a change is to a feature and/or capability is made at the DIAL server device 4. In one or more embodiments, the repository can periodically query the DIAL server device 4 to determine one or more capabilities and/or one or more features of the DIAL server device 4.

In one or more embodiments, a UPnP server 35, for example, as discussed with reference to FIG. 2B, can receive an HTTP request 52 (for example, a DIAL device description request) from the DIAL client device 16. The UPnP server 35 can send an HTTP response 54 that includes information associated with the one or more capabilities and/or one or more features of the DIAL server device 4. For example, as illustrated in FIG. 6C, the UPnP server 35 can format a UPnP device description as part of the HTTP response 54 to include a capabilities tag 56 and one or more capabilities attributes 58 such that the DIAL client device 16 can extract one or more features and/or capabilities. In one or more embodiments, the DIAL client device 16 can order or position discovered first screen devices such that the order of presentation is based, at least in part, on the HTTP response 54, the response 19, or both.

Figure 7:
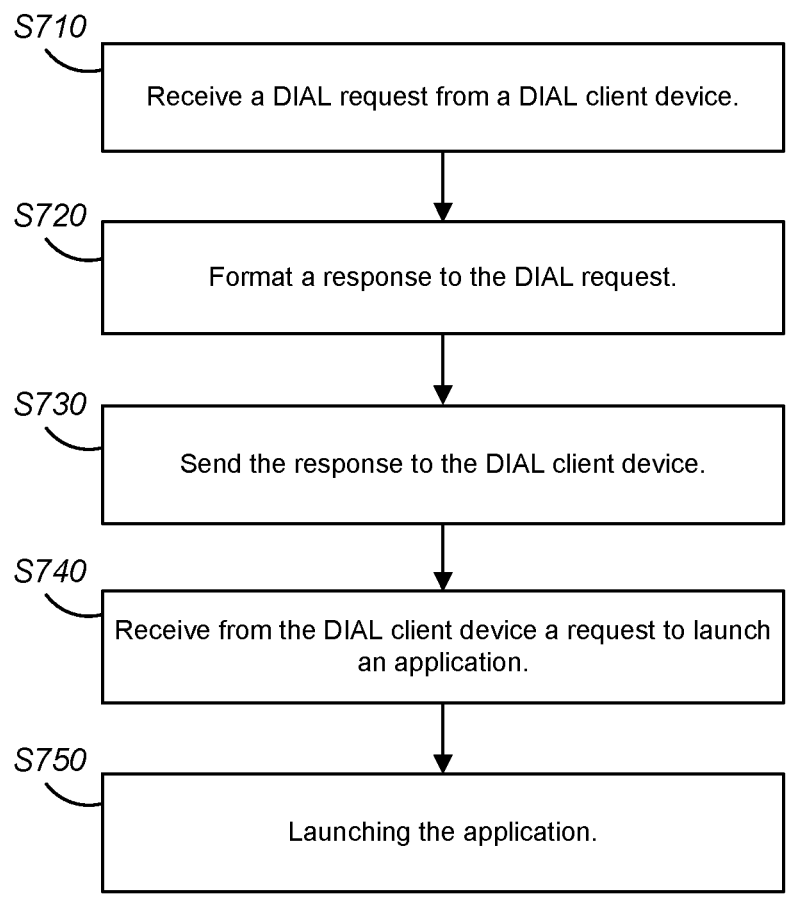
FIG. 7 is a flow chart illustrating a method for formatting a friendly name and providing additional information associated with a first screen device, according to one or more aspects of the present disclosure.

FIG. 7 is a flow chart illustrating a method for formatting a friendly name associated with a first screen device and for formatting a response to a DIAL client device using a DIAL protocol, according to one or more aspects of the present disclosure.

The DIAL server device 4 may be programmed with one or more instructions (e.g., HNC controller instructions), such as software 32, for formatting a response to a DIAL client device using a DIAL protocol, that when executed by a processor or controller 33 causes the DIAL server device 4 to perform one or more operations including, but not limited to, receive a DIAL request and to respond to the DIAL request with information associated with the DIAL server device 4, such as information relating to one or more capabilities of the DIAL server device 4, for example, one or more capabilities and/or one or more features of one or more applications/software executed and/or hosted by the DIAL server device 4, according to one or more aspects of the present disclosure. In one or more embodiments, the DIAL server device 4 is referred to as a first screen device. In FIG. 7, it is assumed that any one or more of the devices include their respective controllers and their respective software stored in their respective memories, as discussed above in connection with FIGS. 1-4C and 6A-6C, which when executed by their respective controllers perform the functions and operations in accordance with the example embodiments of the present disclosure (e.g., including formatting of a response to a DIAL request).

The DIAL server device 4 comprises a controller 33 that executes one or more computer-readable instructions, stored on a memory 31, that when executed perform one or more of the operations of steps S710-S750. In one or more embodiments, the one or more instructions can be one or more software applications, for example, one or more software 32. While the steps S710-S750 are presented in a certain order, the present disclosure contemplates that any one or more steps can be performed simultaneously, substantially simultaneously, repeatedly, in any order or not at all (omitted).

At step S710, the DIAL server device 4 receives a DIAL request from the DIAL client device 16. The DIAL request can include a DIAL discovery request 17. In one or more embodiments, the DIAL server device 4 is associated with a UPnP server 35 and the DIAL request includes a HTTP request 52 received by the UPnP server 35. For example, the UPnP server 35 can be included as part of the DIAL server device 4 (located locally) or can be connected (for example, communicatively coupled) to the DIAL server device 4 (located remotely).

At step S720, the DIAL server device 4 formats a response to the DIAL request. In one or more embodiments, in response to a DIAL discovery request 17, the DIAL server device 4 can format a response 19 as discussed with reference to FIGS. 6A and 6B. In one or more embodiments, in response to an HTTP request 52, a UPnP server 35 associated with the DIAL server device 4 can format a response 54 as discussed with reference to FIGS. 6A and 6C. In one or more embodiments, both a response 52 and a response 54 is sent to the DIAL client device 16.

At step S730, the DIAL server device 4 sends the response, for example, response 19 and/or response 54, to the DIAL client device 16. In one or more embodiments, the response may include a friendly name that has been formatted as discussed with reference to FIGS. 3A-4C.

At step S740, the DIAL server device 4 receives from the DIAL client device 16 a request to launch an application, for example, an application that is capable of or suitable for playback of an asset or content received from the DIAL client device 16. For example, a user of DIAL client device 16 based, at least in part, on the response from the DIAL server device 4 (for example, response 19 and/or response 54), can select the DIAL server device 4 for playback of a selected asset.

At step S750, the DIAL server device 4 launches the application requested by the DIAL client device 16. For example, the DIAL server device 4 can be a first screen device such as a DIAL-enabled television that includes one or more features and/or one or more capabilities for playback of the asset or content received from the DIAL client device 16. In this way, for example, a user of DIAL client device 16 is provided with additional information about the DIAL server device 4 so that the user can select the network device that will provide the best QoE. In one or more embodiments, the DIAL client device 16 automatically, without user intervention, determines the network device best suited for playback of the asset or content based, at least in part, on the response (for example, response 19 and/or response 54), sends the request to launch an application to the DIAL server device 4, and transmits the asset or content to the DIAL server device 4. In one or more embodiments, the DIAL client device 16 displays a list or menu of network devices based, at least in part, on any one or more of steps S710-S730. For example, the DIAL client device 16 can order or position the friendly name 27 associated with the DIAL server device 4 based on a response (such as response 19 and/or response 54) from the DIAL server device 4 to a DIAL request (such as DIAL request 17 and/or DIAL request 52).

By extending the response to a DIAL discovery request and/or a DIAL description request, the DIAL server device 4 can be elevated to a preferred or a priority network device. This preferred DIAL server device 4 is then more likely to be selected by a user and/or a DIAL client device 16 for playback of an asset and/or content. In this way, the QoE of the user is enhanced or improved as the network device with the features/capabilities most suitable for playback of the asset and/or content, the preferred DIAL server device 4, is more likely to be selected as the preferred DIAL server device will, for example, be positioned at the top of a list or menu presented to a user. Additionally, a DIAL client device 16 can also use the extended information provided by the preferred DIAL server device 4 in a response 19 and/or a response 54 to automatically determine that the preferred DIAL server device 4 will provide a more enjoyable experience.

According to some example embodiments of inventive concepts disclosed herein, there are provided novel solutions for formatting a response to a DIAL request, such as a DIAL discovery request and/or a DIAL device description request. The novel solutions according to example embodiments of inventive concepts disclosed herein provide features that enhance the presentation of one or more first screen devices in a list or menu at a second screen device by providing the one or more first screen devices in a preferred order. For example, a first screen device (for example DIAL server device 4) can respond to a DIAL request from a second screen device (for example, DIAL client device 16) with a formatted response (such as response 54 and/or response 19) that includes information associated with one or more capabilities/features of application(s) executed or hosted by the first screen device. The DIAL client device 16 can base, at least in part, the presentation order of the one or more first screen devices on the response that includes or is indicative of one or more capabilities/features. In this way, a user is presented with a listing of the one or more first screen devices with the preferred first screen device, for example, the device most capable of playing back the selected content, at the top of the list. Thus, a user is most likely to select the first screen device that will provide a more enjoyable experience. In one or more embodiments, the DIAL device 16 can automatically select the preferred DIAL server device 4 based on the response 54, the response 19 or both.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A first screen device of a network utilizing a discovery and launch (DIAL) protocol for formatting a response to a DIAL request, comprising:
   a memory storing one or more computer-readable instructions;
   a processor configured to execute the one or more computer-readable instructions to:
   receive the DIAL request from a DIAL client device;
   format the response to the DIAL request, wherein formatting the response comprises:
      providing one or more capabilities associated with the first screen device; and
   send the response to the DIAL client device.

2. The first screen device of claim 1, wherein the one or more capabilities comprise any of a digital rights media (DRM) capability, a video format capability, an audio format capability, a high-bandwidth digital content protection (HDCP) capability, a trusted execution environment (TEE) capability, or a combination thereof.

3. The first screen device of claim 1, wherein the DIAL request is a DIAL discovery request.

4. The first screen device of claim 3, wherein providing one or more capabilities associated with the first screen device comprises:
   inserting a capability header in the response, wherein the capability header includes a uniform resource locator (URL) associated with the first screen device, wherein a file identified by the URL includes one or more capabilities associated with the first screen device.

5. The first screen device of claim 1, wherein the processor is configured to execute one or more further instructions to:
   receive, from the DIAL client device, a request to launch an application at the first screen device, wherein the application requires at least one of the one or more capabilities.

6. The first screen device of claim 1, wherein the first screen device comprises a universal plug and play (UPnP) server, and wherein the DIAL request is a DIAL device description request, and wherein formatting the response to the DIAL request comprises:
   formatting a UPnP device description to include a capabilities tag and one or more capabilities attributes associated with the capabilities tag, wherein the one or more capability attributes identify the one or more capabilities.

7. The first screen device of claim 6, wherein the one or more capabilities attributes comprise any of a digital rights media (DRM) attribute, a video format attribute, an audio format attribute, a high-bandwidth digital content protection (HDCP) attribute, a trusted execution environment (TEE) attribute, or a combination thereof.

8. A method for formatting, by a first screen device, a response to a discovery and launch (DIAL) client device using a DIAL protocol, the method comprising:
   receiving the DIAL request from a DIAL client device;
   formatting the response to the DIAL request, wherein formatting the response comprises:
   providing one or more capabilities associated with the first screen device; and
   sending the response to the DIAL client device.

9. The method of claim 8, wherein the one or more capabilities comprise any of a digital rights media (DRM)

capability, a video format capability, an audio format capability, a high-bandwidth digital content protection (HDCP) capability, a trusted execution environment (TEE) capability, or a combination thereof.

10. The method of claim 8, wherein the DIAL request is a DIAL discovery request.

11. The method of claim 10, wherein providing one or more capabilities associated with the first screen device comprises:
   inserting a capability header in the response, wherein the capability header includes a uniform resource locator (URL) associated with the first screen device, wherein a file identified by the URL includes one or more capabilities associated with the first screen device.

12. The method of claim 8, further comprising:
   receiving, from the DIAL client device, a request to launch an application at the first screen device, wherein the application requires at least one of the one or more capabilities.

13. The method of claim 8, wherein the first screen device comprises a universal plug and play (UPnP) server, and wherein the DIAL request is a DIAL device description request, and wherein formatting the response to the DIAL request comprises:
   formatting a UPnP device description to include a capabilities tag and one or more capabilities attributes associated with the capabilities tag, wherein the one or more capability attributes identify the one or more capabilities.

14. The method of claim 13, wherein the one or more capabilities attributes comprise any of a digital rights media (DRM) attribute, a video format attribute, an audio format attribute, a high-bandwidth digital content protection (HDCP) attribute, a trusted execution environment (TEE) attribute, or a combination thereof.

15. A non-transitory computer-readable medium storing one or more instructions for formatting a discovery and launch (DIAL) response to a DIAL client device, which when executed by a processor of a first screen device, cause the first screen device to perform one or more operations comprising:
   receiving the DIAL request from a DIAL client device;
   formatting the response to the DIAL request, wherein formatting the response comprises:
      providing one or more capabilities associated with the first screen device; and
      sending the response to the DIAL client device.

16. The non-transitory computer-readable medium of claim 15, wherein the one or more capabilities comprise any of a digital rights media (DRM) capability, a video format capability, an audio format capability, a high-bandwidth digital content protection (HDCP) capability, a trusted execution environment (TEE) capability, or a combination thereof.

17. The non-transitory computer-readable medium of claim 15, wherein the DIAL request is a DIAL discovery request, and wherein providing one or more capabilities associated with the first screen device comprises:
   inserting a capability header in the response, wherein the capability header includes a uniform resource locator (URL) associated with the first screen device, wherein a file identified by the URL includes one or more capabilities associated with the first screen device.

18. The non-transitory computer-readable medium of claim 15, wherein the one or more instructions, when executed by the processor, further cause the first screen device to perform one or more further operations comprising:
   receiving, from the DIAL client device, a request to launch an application at the first screen device, wherein the application requires at least one of the one or more capabilities.

19. The non-transitory computer-readable medium of claim 15, wherein the one or more instructions, when executed by the processor, further cause the first screen device to perform one or more further operations comprising:
   formatting a UPnP device description to include a capabilities tag and one or more capabilities attributes associated with the capabilities tag, wherein the one or more capability attributes identify the one or more capabilities.

20. The non-transitory computer-readable medium of claim 19, wherein the one or more capabilities attributes comprise any of a digital rights media (DRM) attribute, a video format attribute, an audio format attribute, a high-bandwidth digital content protection (HDCP) attribute, a trusted execution environment (TEE) attribute, or a combination thereof.

* * * * *